United States Patent [19]
Ochi

[11] Patent Number: 5,227,810
[45] Date of Patent: Jul. 13, 1993

[54] IMAGE READER/RECORDER DEVICE FOR READING OUT AND RECORDING IMAGES ON A RECORDING MATERIAL

[75] Inventor: Tsuneo Ochi, Fuchu, Japan
[73] Assignee: Casio Computer Co., Ltd., Tokyo, Japan
[21] Appl. No.: 508,079
[22] Filed: Apr. 11, 1990

[30] Foreign Application Priority Data

| May 16, 1989 | [JP] | Japan | 1-120395 |
| May 19, 1989 | [JP] | Japan | 1-124511 |
| May 22, 1989 | [JP] | Japan | 1-126707 |

[51] Int. Cl.$^5$ ............ H04N 1/028; H04N 1/032; G01D 15/10; G01D 15/16
[52] U.S. Cl. ............ 346/76 PH; 358/672
[58] Field of Search ............ 358/471, 472, 482, 483; 346/76 PH

[56] References Cited

U.S. PATENT DOCUMENTS 4,868,669 9/1989 Miyazawa .............. 346/76 PH

FOREIGN PATENT DOCUMENTS 0235827 9/1987 European Pat. Off. ....... 346/76 PH
0020040 2/1977 Japan .............. 346/76 PH
0242552 10/1987 Japan .............. 346/76 PH

OTHER PUBLICATIONS

Wu, "Document Reader And Printer", IBM Bulletin, vol. 16, No. 11, 4174, pp. 3568-3569.

Primary Examiner—Benjamin R. Fuller
Assistant Examiner—Huan Tran
Attorney, Agent, or Firm—Frishauf, Holtz, Goodman & Woodward

[57] ABSTRACT

An image reader and thermal recorder comprises a substrate, an image circuit section and a thermal display circuit section. The substrate is formed of either a monocrystalline silicon wafer or insulating material such as ceramics, glass or quartz having a polycrystalline silicon layer on the surface. The image circuit section comprises photoelectric conversion cells and transfer circuit elements for transferring signals charged in each of photoelectric cells, which are integrally formed in and on the substrate. The display circuit section comprises a shift register for registering display data sensed by photoelectric cells, latch circuit, resistive heating elements including polycrystalline silicon layer and display driving elements, which are also integrally formed in and on the substrate.

28 Claims, 7 Drawing Sheets

IMAGE READER/RECORDER DEVICE FOR READING OUT AND RECORDING IMAGES ON A RECORDING MATERIAL

BACKGROUND OF THE INVENTION

1. Field of the Invention

The present invention relates to an image and thermal recorder device for use in a facsimile, a copying machine, etc., for reading out an image and recording it.

2. Description of the Related Art

An image reader and thermal recorder device, such as a copying machine, for optically reading out an image and recording it includes a readout section, a printing section, a control section, etc., the readout section reading out an image on the basis of an instruction by the control section, the control section storing the read-out image data and the printing section being responsive to an instruction by the control section to sequentially print the stored image data on, for example, a recording paper sheet. In this case, the readout section comprises of a large number of photoelectric conversion elements, such as MOSFETs (Metal Oxide Semiconductor Field Effect Transistors) or CCD's (Charge Coupled Devices), formed in and on a substrate and the printing section comprises of a large number of heat generation resistive elements formed over the substrate. The control section comprises control means for controlling the readout section and printing section and memory means for storing the read-out image data.

In the image reader and thermal recorder device, the readout section, printing section and control section, being manufactured in a separate fashion, become cumbersome upon assembly. Recently, the readout section and printing section extending the control section are formed as a unit over a single substrate, and the control section is connected to this unit to provide a device body.

In the image reader and thermal recorder device, however, an assembling operation can be somewhat simplified, but it is necessary to connect such readout and printing sections to the control section. For this reason, a large number of connection terminals have to be connected in a proper way. Thus, a very cumbersome operation is necessary and hence reliability is lowered upon assembly.

SUMMARY OF THE INVENTION

It is accordingly the object of the present invention to provide an image reader and thermal recorder device which allows the respective circuit components of readout, printing and control sections to be formed, as an integral unit, in and on a single substrate, which largely simplifies a requisite connection operation upon assembly and ensures a high quantity production.

According to the present invention, there is provided an reader/recorder device comprising:

a substrate having at least one semiconductor layer;

an image circuit section including photoelectric conversion cells formed in the semiconductor layer and transfer circuit elements including first conductive leads and formed in and on the semiconductor layer to transfer signals which are charged in each of the photoelectric conversion cells; and a display circuit section including:

a shift register formed in the semiconductor layer to shift display data, latch circuit elements formed in the semiconductor layer, resistive heating elements formed on the semiconductor layer, display driver elements formed in the semiconductor layer to drive the resistive heating elements in accordance with the display data shifted in the shift register, and second leads for electrically connecting the shift register, the latch circuit elements, the display driver elements and the resistive heating elements in a sequential fashion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

First Embodiment

An image and thermal display recorder device according to a first embodiment of the present invention will be explained below with reference to FIGS. 1 and 2.

Figure 2:
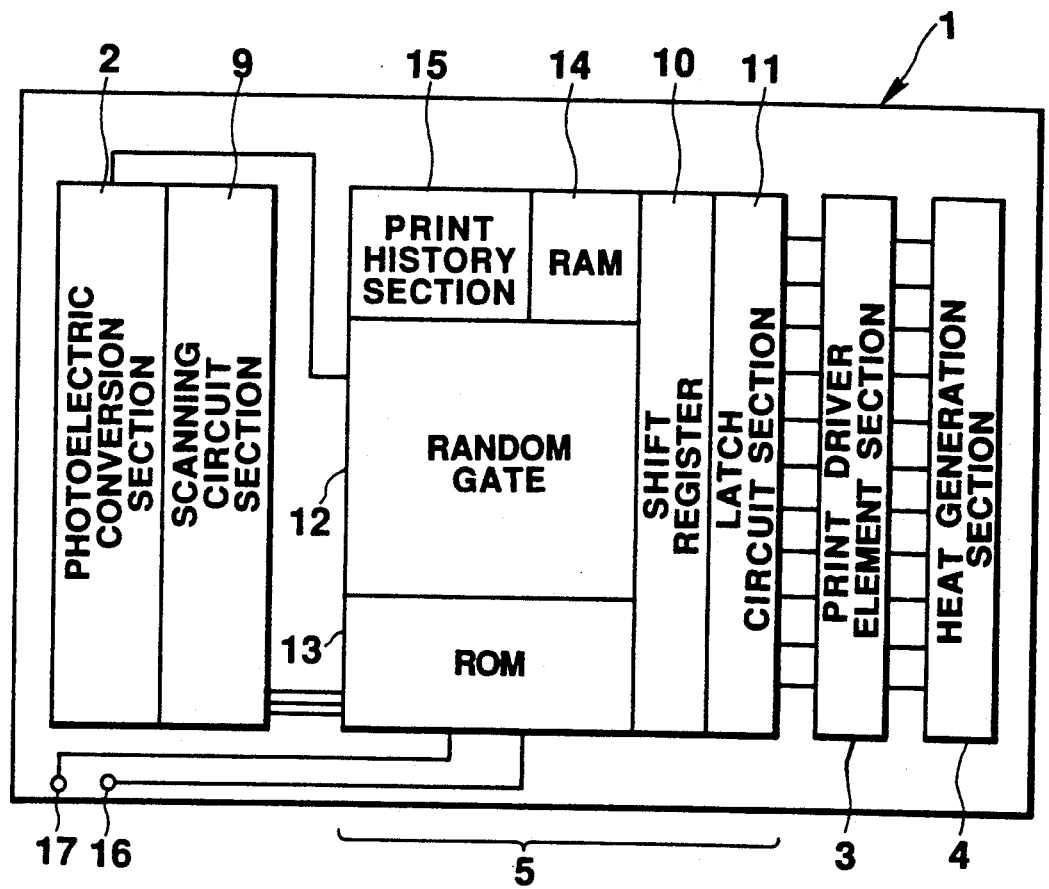
FIG. 2 is a plan view showing an array of respective circuit sections shown in FIG. 1.

FIG. 2 is a diagrammatic view showing the image reader and thermal recorder device of the present invention. The image and thermal recorder device is formed as a rectangular sheet-like unit as a whole. On one surface of a single crystal silicon substrate are provided a photoelectric conversion section 2 (left side), print driver element section 3 (right side) and heat generation section 4 (right side), and a control circuit section 5 (intermediate). The photoelectric conversion section 2 comprises a photoelectric conversion circuit which includes phototransistors 6 for reading out an image formed as an array along the side of the silicon substrate 1. The phototransistors are formed of MOS-FETs as will be set forth below. The print driver element section 3 comprises a larger number of MOSFETs 7 of a larger area as will be set forth below to provide a print drive element for selectively driving the heat generation section 4. The heat generation section 4 is driven by the print driver element, section 3 to generate heat. The heat generation section comprises a larger number of thin film heat generating resistor elements 8 as will be set forth below and provided on the right side of the silicon substrate 1. The control circuit section 5 is provided on the middle portion and is adapted to control a whole device. A scanning circuit section 9 is provided near the photoelectric conversion section 2 which is located on the left side of the substrate. A shift register 10 and latch circuit section 11 are provided near the print driver element section 3 which is located on the right side of the substrate 1. Between the scanning circuit 9 and the shift register 10 are provided a random gate 12, a ROM (Read Only Memory) 13 for control, a RAM (Random Access Memory) 14 for storing image data which has been read in, a print history section 15, and so on, all of which comprise MOSFET's. The scanning circuit section 9 controls the storage and transfer of a signal charge in and to the photoelectric circuit section 9. The random gate 12 includes an A/D (Analog/Digital) conversion section, an S/P (Serial/Parallel) conversion section, a P/S conversion section and a timing pulse generation section as well as various gates. The ROM 13 for control comprises a control circuit for controlling a data write/read operation. The RAM 14 comprises a memory circuit for storing data which has been digitized at the random gate 12. A signal terminal 16 for a read mode and signal terminal 17 for a print mode are provided on the left upper corner of the silicon substrate 1.

The function of respective parts of the image reader and thermal recorder device will be explained below with reference to FIGS. 1 and 2.

Upon receipt of a read mode signal from a signal terminal 16, the control circuit 5 enables a timing pulse to be generated from the timing pulse generation section of the random gate 12. The timing pulse is supplied to the scanning circuit section 9 to drive the photoelectric conversion section 2. Upon projection of light on the respective phototransistor 6, the photoelectric conversion section 2 stores a signal charge of a corresponding light amount and sequentially transfers it to the next adjacent phototransistor 6 according to transfer signals from the scanning circuit section 9 and finally to the A/D conversion section in the random gate 12 in a serial fashion, as will be set forth below. The corresponding signal, after being digitized by the A/D conversion section, is supplied as image data to the S/P conversion section in synchronization with a timing pulse coming from the timing pulse generation section to convert it to parallel data for each plural bits, such as 8 bits. The parallel data is written into the RAM 14.

Upon the supply of a print mode signal to the signal terminal 17, the control circuit section 5 reads the image data which is written in the RAM 14 onto the P/S conversion section in one line unit and supplies it to the print history section 15 after being converted into serial data. The print history section 15 includes registers for storing and holding preceding and present image data and a preheat data preparation section for preparing the preheat-print data from the preceding and present data. The preheat data prepared by the print history section 15 is read out by a control signal coming from the ROM 13 and stored in the shift resister 10 in synchronization with a clock pulse supplied from the timing pulse generation section. When the preheat data of one line is held in the shift register 10, it is delivered to the latch circuit section 11 by a control signal which is supplied from the timing pulse generation section. A print pulse which is supplied from the timing pulse generation section to the print driver section 3 is, for example, a main pulse or a sub-pulse for reheating. A sub-pulse is supplied to an associated circuit when preheat data is held in the latch circuit section 11. For example, when the preceding print data is continuous with the present print data, the preheat data regards it as "0(none)". By so doing, it is possible to discontinue the preheating of the previously heated resistive elements 8 in the heating section 4 and hence to prevent its temperature rise.

Upon receipt of the sub-pulse, an n-MOSFET 7 in the print driven element section 3 is driven in accordance with the print data and the respective heating resistive element 8 in the heating section 4 is turned on, causing it to be preheated. Upon completion of that preheating step, the present print data which has been held in the print history section 15 is latched to the latch circuit section 11. At this time, a main pulse is supplied from the timing pulse generation section to the associated circuit, enabling a character corresponding to the present image data to be printed. Upon the completion of printing of characters corresponding to one line, the next one line data is read out of the RAM 14, repeating the aforementioned operation. It is thus possible to print the image data.

Figure 1:
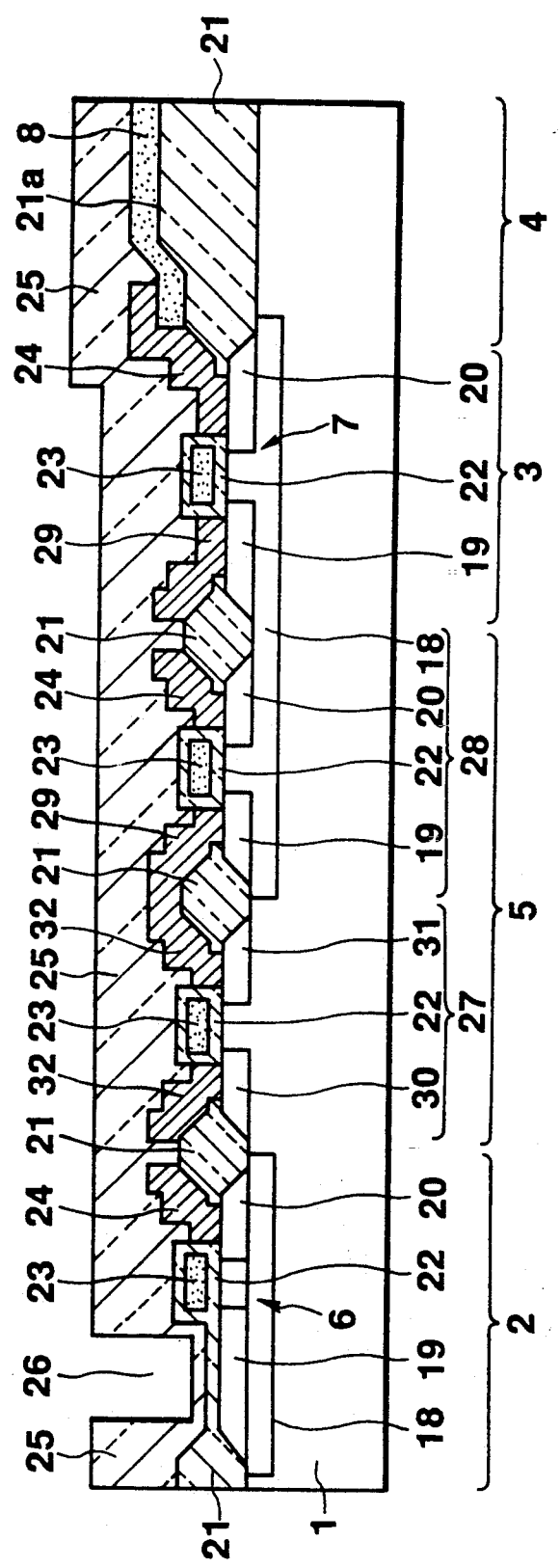
FIG. 1 is an enlarged, cross-sectional view showing a major portion of an image reader and thermal recorder device according to a first embodiment of the present invention.

FIG. 1 is an enlarged, cross-sectional view showing an image reader and thermal recorder device of the present invention. The arrangement of the image reader and thermal recorder device will be explained below with reference to FIG. 1.

A silicon substrate 1 is obtained by cutting a wafer of an n-type single crystal silicon. On the silicon substrate 1 are arranged, in block units, a photoelectric section 2 comprising phototransistors 6, a control circuit section 5 comprising C-MOSFETs, a print driver element section 3 comprising n-MOSFETs and a heat generation section 4 comprising heat generating resistive elements 8, respectively.

The arrangement of the various parts as set forth above will be explained below in more detail.

The phototransistors 6 of the photoelectric conversion section 2 of n-MOSFETs which are arranged along a direction of the width of the photoelectric conversion section 2 disposed on the left side of the silicon substrate 1. The respective phototransistor includes a p type region 18 formed by doping an acceptor impurity, such as boron (B), in the upper surface portion of the silicon substrate 1 and two n type regions 19 and 20 formed by doping a donor impurity, such as phosphorus (P), in the p-type region 18. A field isolation film 21, such as $SiO_2$, is formed around the P type region 18 by a thermal oxidation such as a LOCOS (Local Oxidation of Silicon). The P type region 18 is electrically isolated by the field isolation film 21. A gate electrode 23 is formed at a location between the n-type regions 19 and 20 and covered with a gate insulating film 22 such as $SiO_2$. The gate electrode 23 has low resistivity. The gate electrode 23 is formed of a polysilicon layer, which is formed by a plasma CVD (Chemical Vapor Deposition) over the substrate under a monosilane (SiH₄) gas and doped with an impurity ion such as a P ion into the polysilicon layer.

The n type regions 19 and 20 are formed as source and drain regions, respectively. When light is incident on the n type region 19 with a reverse bias applied across the n type region 19 and the p type region 18, a signal charge is stored at a junction of the n type region 19 and the P type region 18. The signal charge is proportional in amount to the amount of the incident light, and is transferred through the n type region 20 to the n type region 19, as viewed in a horizontal direction of FIG. 1, with a voltage applied across the gate electrode 23 and a drain electrode 24. A drain electrode 24 is extended over the n type region 20 and formed as wiring pattern. The wiring pattern 24 is formed as a film over the substrate by evaporating or sputtering a metal, such as Al, Al-Si, Mo and W, and provides the scanning circuit section 9 for transferring the signal charge as set forth above. An insulating protective layer 25 is formed by a CVD method over the wiring pattern 24, the gate electrode 23 and the n type region 19 on the source side. The insulating protective layer 25 has a resistance to oxidation and a good wear and may be of a single SiON layer structure or a double $SiO_2/SiN$ layer structure. A recessed light receiving section 26 is formed in the insulating protective layer 25 at a location corresponding to the n type region 19 on the source side of the photoelectric conversion section. The recessed section 26 allows external light to be incident on the n type region 19 and the insulating protective layer 25 is thinly formed at the recessed section 26 to allow the transmission of the light.

The C-MOSFETs of the control circuit section 5 comprise a combination of a P-MOSFET 27 and n-MOSFET 28 and formed over a broader area between the photoelectric conversion section 2 and the print driver element section 3. In actual practice, such FETs of a small area are formed as many arrays, but here only one combination is shown for brevity's sake. The C-MOSFETs are surrounded with the field isolation film 21 and the n- and P-MOSFETs 28 and 27 are defined by the field isolation film 21. The n-MOSFET 28 is formed in the same way as the aforementioned photoresistor 6 except that a wiring pattern 29 is formed over the n type region 19 on the source side (the left side) of the n-MOSFET 28 and on the right side of the P-MOSFET 27. That is, the wiring pattern 29 which is formed over the n type region 19 on the source side is, like the aforementioned wiring pattern 24, formed of a metal, such as Al, Al-Si, Mo and W, and connected to the P-MOSFET 27 on the left side. Further, the P-MOSFET 27 is formed in the same way as the aforementioned n-MOSFET 28, except that P type regions 30 and 31 are formed directly in the surface portion of the substrate 1, and located between the phototransistor 6 and the n-MOSFET 28. In the wiring pattern 32 formed over the P type regions 30 and 31, the wiring pattern portion 32 on the source side (the left side) is connected to the wiring pattern 24 on the drain side of the phototransistor 6, and the wiring pattern portion 32 on the drain side (the right side) is connected to the wiring patterns 29 on the source side of the n-MOSFET 28. An insulating protective layer 25 is formed over the C-MOSFET array comprising the control circuit section 5.

The n-MOSFET 7 comprising the print driver element 3 is formed in substantially the same way as the aforementioned n-MOSFET 28. The n-MOSFET 7 is driven by the control circuit section 5 to enable a current to flow through the heat generation resistive element 8 in the heat generation section 4 to heat the element. The n-MOSFET 7 is for a large current use and has an area which is a few times to tens of times as large as that of the n-MOSFET 28. The n-MOSFET 7 is connected by the wiring pattern 29 to the latch circuit section 11 and by the wiring pattern 24 to the heat generation resistive element 8. The n-MOSFET 7 is surrounded with the field isolation film 21. The insulating protective layer 25 is also formed over the n-MOSFET 7.

The heat generation resistive element 8 comprising the heat generation section 4 is formed over the right-hand side substrate portion with the field isolation film 21 formed therebetween. That is, the field isolation film 21 formed of $SiO_2$ is formed by the aforementioned LOCOS method over the upper surface of the silicon substrate 21. In the field insulating film 21, that portion on which the heat generation resistive element 8 is provided is formed by a repetitive LOCOS process as a raised or thickened portion on the upper surface of the substrate. The formation of a polysilicon film on that raised or thickened portion formation area prior to thermal oxidation promotes the growth of $SiO_2$ in the polysilicon film and hence forms the aforementioned raised or thickened portion 21a. The latter is known as a SEPOX method. The top surface of the raised portion 21a is at a height level substantially the same as that of the wiring pattern (24, 29 and 32) except for the wiring pattern on the drain side of the n-MOSFET 7 and is formed in the width direction over the full length of the silicon substrate 1. A polysilicon layer is formed by the aforementioned plasma CVD method on the upper surface of the raised portion 21a and an impurity is doped into the polysilicon layer to provide heat generation resistive elements 8 as set forth above. The heat generation resistive elements 8 are equidistantly formed at a predetermined pitch along the longitudinal direction of the raised portion 21a and the top surfaces of the resistive elements 8 are formed at a height level substantially the same as that of the wiring pattern 24 on the drain side of the n-MOSFET 7. The respective heat generation resistive element 8 is formed continuously in a range from a lower portion to a higher portion of the raised portion 21a. A corresponding lower portion of the resistive element 8 is connected to the wiring pattern 24 of the n-MOSFET and the other portion thereof is connected to a ground line, not shown. The heat generation resistive element 8 is doped with a given dose of a P impurity ion to provide a predetermined sheet resistivity of a few tens of $\Omega$/square. The sheet resistivity of the resistive element 8 is determined by the P ion concentration implanted. In this case, the resistive element 8 is so formed that the portion corresponding to the upper surface of the raised portion 21a has the aforementioned predetermined sheet resistivity of a few tens of $\Omega$/square and the other portion has a smaller resistive value than that of the first-mentioned portion of the resistive element 8. The insulating protective layer 25 is formed over the surface of the resistive element 8 such that a portion corresponding to the resistive element is upwardly projected relative to the left-side portion thereof. This structure is very effective to place, for example, a thermosensible paper in a close contact relation on the surface of the insulating protective layer 25 at an area corresponding to the resistive element 8.

The signal terminals 16 and 17 are upwardly projected, as bump electrodes, from the insulating protective layer 25, though being not shown in FIG. 1. That is, the wiring pattern is formed over the silicon substrate 1 with the field isolation film 21 formed therebetween and metal-plated bump electrodes are formed on the wiring pattern through the corresponding underbump metal to provide respective signal terminals 16 and 17.

In this way, it is possible to form, on one single-crystalline silicon substrate 1, the photoelectric conversion section 2 comprised of a larger number of phototransistors 6, control circuit section 5 comprised of C-MOSFETs, print driver element section 3 composed comprised of a large number of n-MOSFETs 7 and heat generation section 4 comprised of a larger number of heat generation resistive elements 8. It is thus possible to largely simplify a connection operation and an assembling operation and hence to achieve a high quantity production. Since the respective electrodes 23 of the n-MOSFETs 6, 7 and C-MOSFETs, for example, and polysilicon layers of the heat generation resistive elements 8 can be formed simultaneously in the manufacturing process, it is possible to efficiently manufacture the device of the present invention without complicating the manufacturing process. The phototransistors 6 of the photoelectric conversion section 2, C-MOSFETs of the control circuit section 5 and n-MOSFETs of the print driver element section 3 are formed by implanting an impurity ion directly into the single crystalline silicon substrate 1, ensuring a greater ion mobility of each element. Since any connection member is not required between the respective circuit elements, the device can be made compact as a whole. The respective heat generation resistive elements 8 of the heat generation section 4 are formed over the substrate by doping an impurity ion in the polysilicon layer, making it possible to adjust a resistive value.

Since the respective heat generation resistive element 8 is formed on the raised portion 21a of the field isolation layer 21 and the corresponding insulating protective layer portion is upwardly projected relative to other portions, the heat generation section 4 can be brought into positive, intimate contact with a recording paper, etc., upon a heat-sensitive copying operation, it is possible to obtain a clear-cut copy under a heat-sensitive condition.

Although, in the first embodiment, the photoelectric conversion section 2, scanning circuit section 9, control circuit section 5, print driver element section 3 and heat generation section 4 are configured all in a planar array, they may be configured in a multi-layered fashion as will be set forth below in connection with a second embodiment. In this case, a silicon substrate 1 can be made compact.

Second Embodiment

Figure 3:
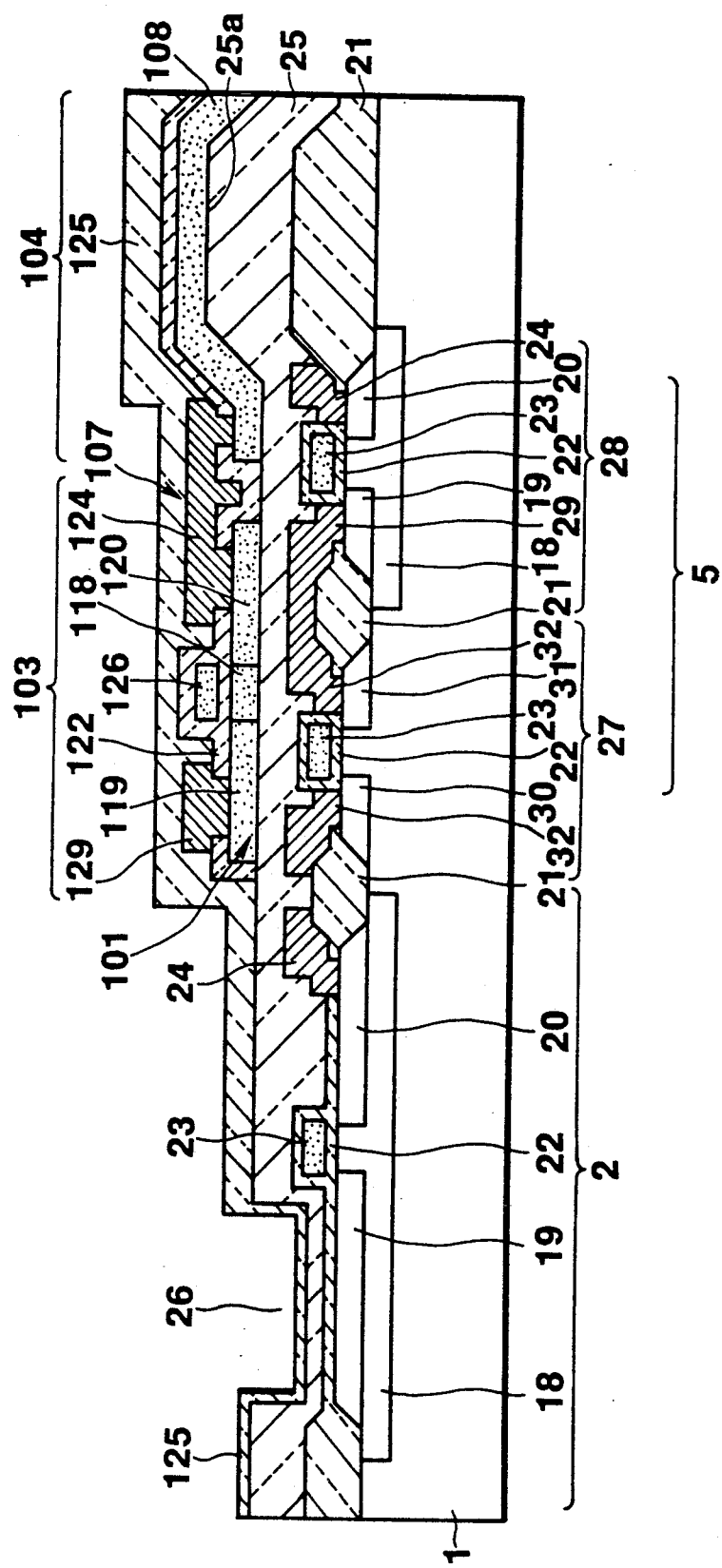
FIG. 3 is an enlarged, cross-sectional view showing a major portion of an image reader and thermal recorder device according to a second embodiment of the present invention.
Figure 4A:
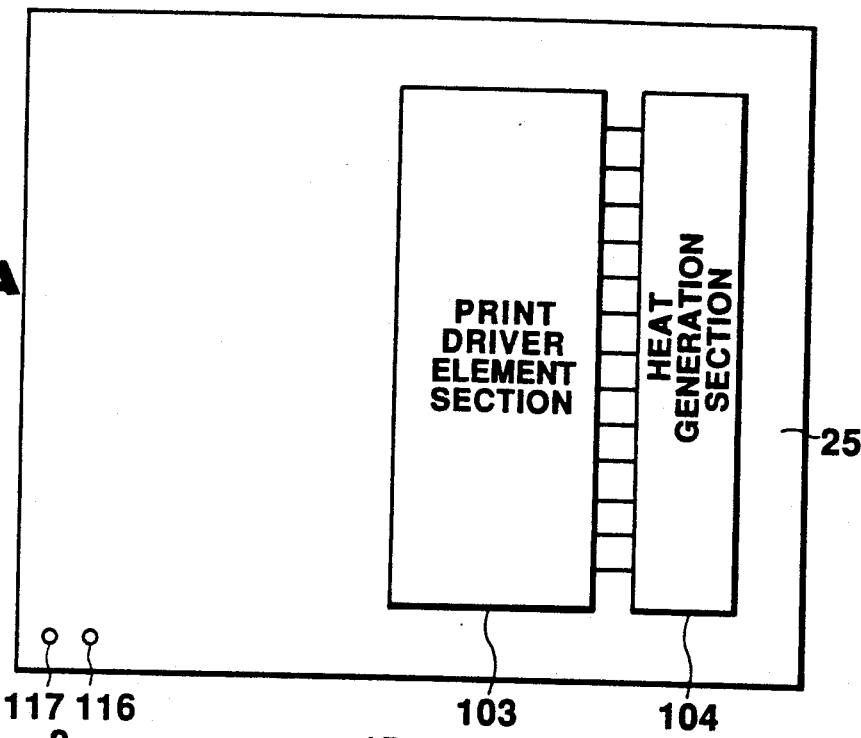
FIGS. 4A and 4B, each, is a plan view showing an arrangement of respective circuit sections as shown in FIG. 3.
Figure 4B:
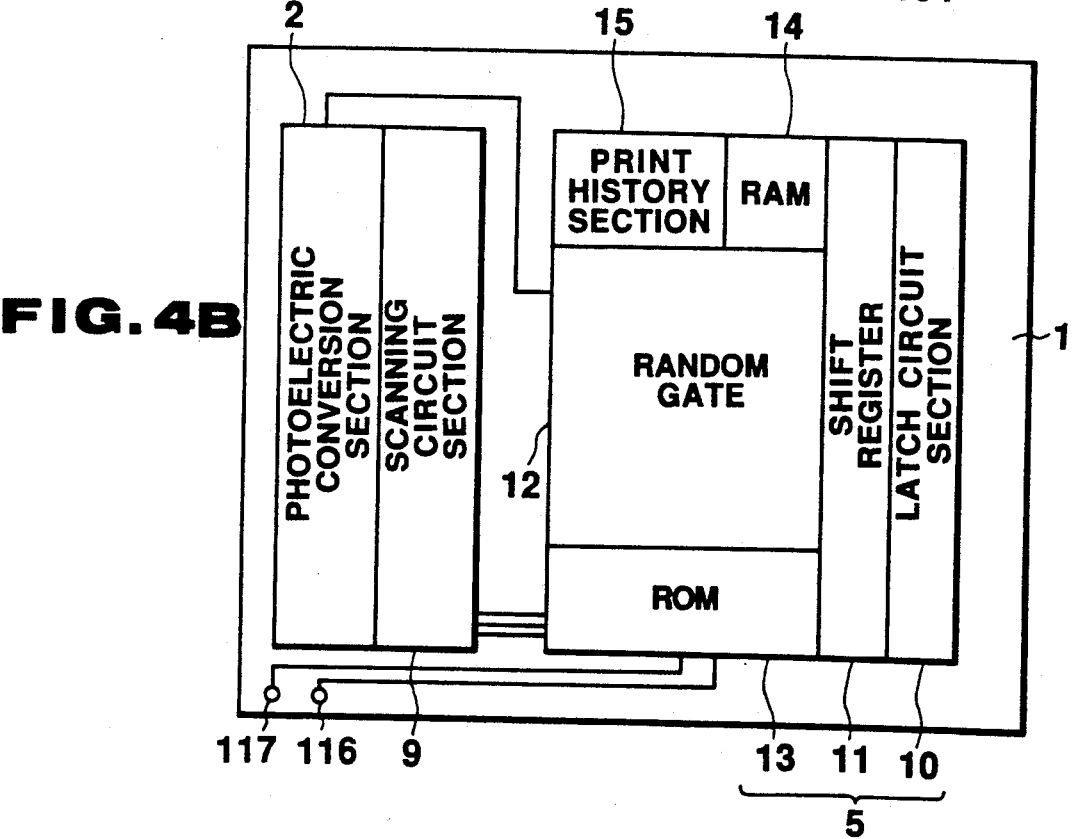

FIG. 3 and 4 show an image and thermal display device according to a second embodiment of the present invention. In the embodiment shown in these figures, a double-layered circuit element array is formed over a substrate with a print driver element section 103 and heat generation section 104 formed as an upper layer. In the second embodiment, a photoelectric conversion section 2, scanning circuit section 9 and control circuit section 5 are formed, as a lower layer, at the substrate as in the case of the first embodiment of the present invention. In FIGS. 3 and 4, the same reference numerals are employed to designate portions or elements corresponding to these shown in FIGS. 1 and 2 and any further explanation is, therefore, omitted.

In the control circuit section 5, a shift register 11 and latch circuit 10 may be formed as the upper layer structure.

The way of forming a print driver element section 103 and heat generation section 104 will be explained below in more detail.

A semiconductor layer 101 of polysilicon is formed on an insulating protective film 25. The semiconductor layer 101 is formed as set forth above in connection with the first embodiment by forming a polysilicon layer by a plasma CVD method and etching it by a photolithographic method to provide a pattern.

B (Boron) and P (Phosphorus) impurity ions are implanted into the semiconductor layer 101 to provide a P type region 118 and n type regions 119 and 120. A gate electrode 126 is formed over the P type region 118 and surrounded with a gate insulating film 122. Wiring patterns are formed on n type regions 119 and 120 to provide the aforementioned print driver element section 103 comprised of n-MOSFETs. Though being not shown in FIG. 3, the wiring pattern 129 which is connected to the n type region serving as a source electrode of an n-MOSFET 107 is connected through a throughhole to a wiring pattern 24 connected to a drain electrode of the C-MOSFET.

A P impurity ion is implanted into a polysilicon layer on a raised portion 25a of the insulating protective layer 25 to provide a heat generation resistive element 108 having a predetermined resistive value. The n-MOSFET 107 is connected by the wiring pattern 124 to the heat generation resistive element. The n-MOSFET 107 and resistive element 108 are wholly covered with an insulating protective layer 125. Signal terminals 116, 117 are connected to control circuit section 5 through the insulating protective layer 25 under lying thereon.

As will be appreciated from the above, the image and thermal display device of a double-layered structure has the advantage of reducing an area of the silicon substrate 1.

In the aforementioned first and second embodiments, the MOSFETs are formed directly in and on the silicon substrate. In this case, the substrate used may be made of an insulating substrate, such as glass, quartz and ceramics, as will be explained below in connection with a third embodiment.

Third Embodiment

Figure 5:
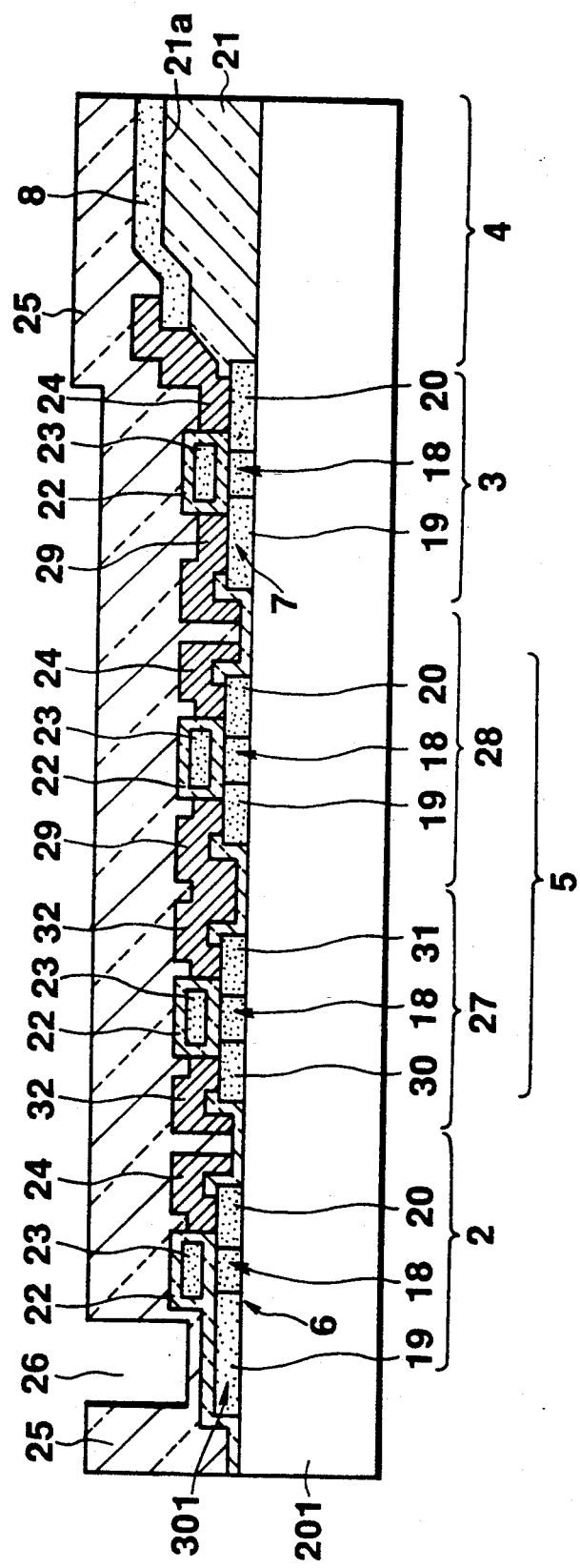
FIG. 5 is an enlarged, cross-sectional view showing a major portion of an image reader and thermal recorder device according to a third embodiment of the present invention.

FIG. 5 is a cross-sectional view showing an image reader and thermal recorder device using an insulating substrate as a substrate. A semiconductor layer 301 is formed on the upper surface of the insulating substrate 201. The semiconductor layer 301 is obtained by forming a polysilicon layer, by a plasma CVD method for instance, over the whole upper surface of the insulating substrate 201 and etching it to provide a pattern.

The third embodiment corresponds to the first embodiment except that a photoelectric conversion section 2, control circuit section 5 and print driver element section 3 are formed all on the semiconductor layer 301. In the third embodiment, the same reference numerals are employed to designate parts or elements corresponding to those shown in the first embodiment and any further explanation is, therefore, omitted.

Fourth Embodiment

Figure 6:
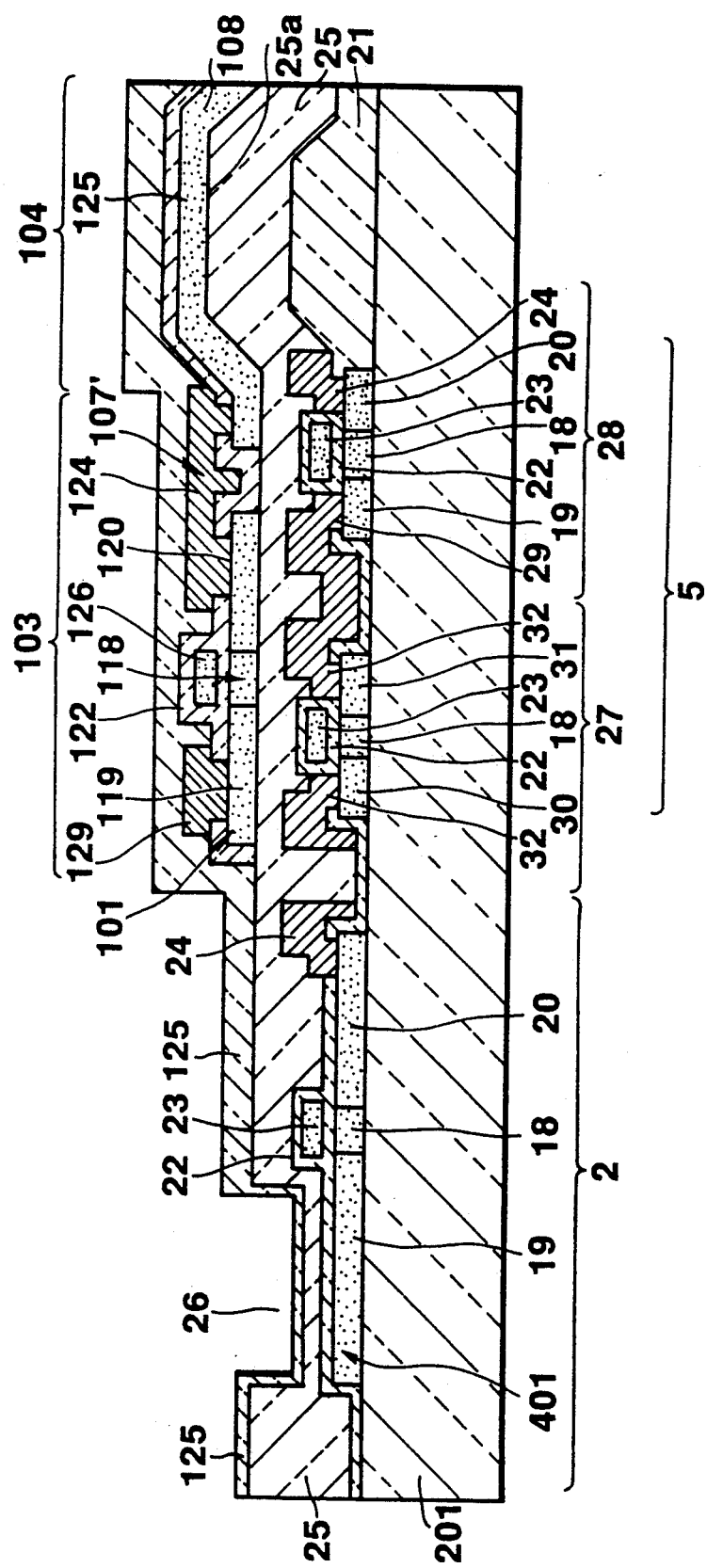
FIG. 6 is an enlarged, cross-sectional view showing a major portion of an image and thermal recorder device according to a fourth embodiment of the present invention.

FIG. 6 is a cross-sectional view showing an image reader and thermal display recorder device, according to a fourth embodiment of the present invention, in which circuit element sections are formed as a two-layered structure over a substrate.

In the fourth embodiment, a semiconductor layer 401 of polysilicon is formed on the insulating substrate 201, and a photoelectric conversion section 2 and control circuit section 5 are formed on the semiconductor layer 401. In the fourth embodiment, a semiconductor layer 101 is, like the second embodiment (FIG. 3), formed on an insulating protective layer 101 to provide a print driver element section 103 and heat generation section 104.

In the aforementioned first to fourth embodiments, the image reader and thermal recorder includes all the circuit sections shown in FIG. 2. In order to achieve a decreased defective product rate, as well as an enhanced reliability and quantity production, by decreasing the number of leads for connecting the image reader and thermal recorder device to an outside apparatus, however, it is not necessary to form the aforementioned circuit sections all in the device.

Any or all of the random gate 12, ROM 13, RAM 14 and print history section 15 in the control circuit section 15 may be provided outside the image reader and thermal recorder device as will be set out below.

Figure 7:
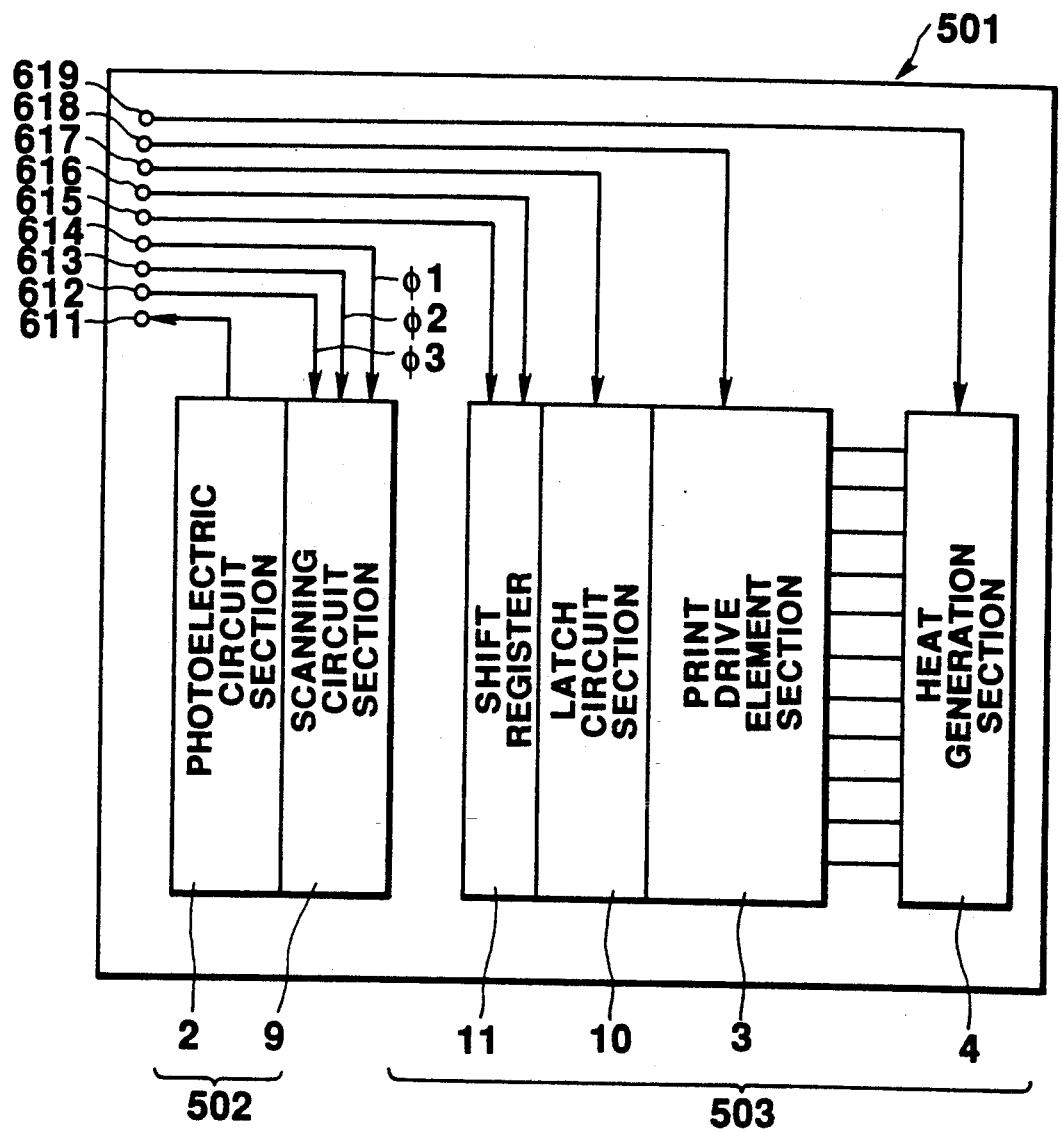
FIG. 7 is a plan view showing an image reader and thermal recorder device having another circuit arrangement.

FIG. 7 shows one form of the image reader and thermal recorder device. The device 501 includes an input section 502 for image readout which comprises a photoelectric conversion section 2 and scanning circuit section 9, an output section 503 for printing which comprises a shift register 11, latch circuit section 10, print driver element section 3 and heat generation section 4, and connection terminals 611 to 619.

In the arrangement shown in FIG. 7, reference numerals 2,3,4,9,10 and 11 represent the same parts or elements corresponding to those shown in the first to fourth embodiments.

The connection terminal 611 is provided for supplying a signal charge which is serially transferred from the photoelectric conversion section 2 to a RAM via an A/D conversion section and S/P conversion section of an external device. The connection terminals 612, 613 and 614 are connected to an external timing pulse generation section and supply scanning pulses $\phi_1$, $\phi_2$ and $\phi_3$ to the scanning circuit section. The connection terminals 615 and 616 are connected to a printing control circuit section of the external device and supplies print data and shift clock pulses to the shift register 11. The connection terminal 617 connects a latch signal to the latch circuit section 10. The connection terminal 618 supplies a print pulse to the print driver element section 3 and the connection terminal 619 is connected to a ground line.

The cross-sectional views of the respective image reader and thermal recorder device as shown in FIGS. 1,3,5 and 6 are substantially not changed even in the case of either a circuit section shown in FIG. 7 or a circuit section shown in FIG. 2. However, both the circuits will be different from each other if the dimension and number of the C-MOSFETs and practical wiring pattern are shown in more detail in the drawings. Here it will be appreciated that the aforementioned circuit is not so shown for brevity's sake.

It is important to note that the image and thermal recorder device as shown in FIGS. 1,3,5, and 6 is also shown as a typical example having elements in the circuit shown in FIG. 7 and that the object and advantages of the present invention can adequately be implemented by the image reader and thermal recorder device as set out above.

Additional advantages and modifications will readily occur to those skilled in the art. Therefore, the invention in its broader aspects is not limited to the specific details, representative devices shown and described herein. Accordingly, various modifications may be made without departing from the spirit or scope of the general inventive concept a defined by the appended claims and their equivalents.

What is claimed is:

1. An image reader/recorder device comprising:
   a substrate including a semiconductor layer which has a major surface;
   an image reader circuit section formed in and on said major surface of said semiconductor layer, said image reader circuit section including:
   photoelectric conversion cells; and
   transfer circuit elements including first conductive leads for transferring signals which are charged in each of said photoelectric conversion cells;
   a recorder circuit section formed in and on said major surface, said recorder circuit section including:
   a shift register for shifting signals supplied from said image reader circuit section;
   latch circuit elements for latching signals supplied from said shift register;
   an insulating isolation layer made of inorganic matter and located in a vicinity of said latch circuit elements;
   resistive heating elements made of polycrystalline material and formed on said insulating isolation layer corresponding to said latch circuit elements, respectively; and
   second conductive leads for electrically connecting said shift register, said latch circuit elements and said resistive heating elements; and
   an insulating protective layer formed on said image reader circuit section and on said recorder circuit section such that portions of said insulating protective layer corresponding to said resistive heating elements project upwardly over a remainder of said insulating protective layer.

2. The device according to claim 1, wherein said semiconductor layer comprises a monocrystalline silicon layer.

3. The device according to claim 2, further comprising control circuit elements formed in said semiconductor layer to control said image reader circuit section and said recorder circuit section, respectively.

4. The device according to claim 3, wherein said control circuit elements include elements formed in said semiconductor layer to control said resistive heating elements based upon last data inputted to said recorder circuit section.

5. The device according to claim 3, further comprising volatile memory elements formed in said semiconductor layer.

6. The device according to claim 5, wherein said resistive heating elements comprise a base layer of polycrystalline silicon with an impurity diffused in said base layer.

7. The device according to claim 3, further comprising a first external terminal for driving said image reader circuit section and a second external terminal for driving said recorder circuit section.

8. The device according to claim 1, further comprising a plurality of external terminals connected to said image reader circuit section and to said recorder circuit section.

9. The device according to claim 1, wherein said semiconductor layer comprises a polycrystalline silicon layer.

10. The device according to claim 9, wherein said resistive heating elements comprise a base layer of polycrystalline silicon with an impurity diffused in said base layer.

11. The device according to claim 9, further comprising control circuit elements formed in said semiconductor layer to control said image reader circuit section and said recorder circuit section, respectively.

12. The device according to claim 11, further comprising control circuit elements formed in said semiconductor layer to control said resistive heating elements based upon last data inputted to said recorder circuit section.

13. The device according to claim 11, further comprising volatile memory elements formed in said semiconductor layer.

14. The device according to claim 1, wherein said semiconductor layer comprises a first layer and a second layer formed over the first layer.

15. The device according to claim 14, wherein said first layer comprises a monocrystalline layer and said second layer comprises a polycrystalline layer.

16. The device according to claim 15, wherein said resistive heating elements are comprised of a base layer of polycrystalline silicon with an impurity diffused in the base layer.

17. The device according to claim 14, wherein said image reader circuit section is formed in said first layer and said recorder circuit is formed in and on said second layer.

18. The device according to claim 17, wherein said first layer further includes control circuit elements formed in said semiconductor layer to control said image reader circuit section and said recorder circuit section, respectively.

19. The device according to claim 14, wherein said first and second layers comprise polycrystalline layers, respectively.

20. The device according to claim 19, wherein said resistive heating elements comprise a base layer of polycrystalline silicon with an impurity diffused in said base layer.

21. The device according to claim 19, wherein said first layer further includes control circuit elements formed in said semiconductor layer to control said image reader circuit section and said display recorder circuit section, respectively.

22. An image reader/recorder device comprising:
a silicon substrate for forming circuit elements and having a major surface;
an image reader circuit section formed in and on said major surface of said substrate, said image reader circuit section including:
photoelectric conversion cells; and
transfer circuit elements for transferring signals charged in each of said photoelectric conversion cells; and
said image reader circuit section;
latch circuit elements for latching signals supplied from said shift register; and
resistive heating elements respectively formed corresponding to said latch circuit elements;
at least a part of said circuit elements of said recorder being formed on said image reader circuit elements so as to cover said transfer circuit elements while said photoelectric conversion cells are exposed.

23. The device according to claim 22, wherein said semiconductor layer comprises a monocrystalline silicon layer.

24. The device according to claim 23, wherein said semiconductor layer comprises a polycrystalline silicon layer.

25. The device according to claim 22, further comprising control circuit elements formed in said semiconductor layer to control said image reader circuit section and said recorder circuit section, respectively.

26. The device according to claim 22, wherein said resistive heating elements comprise a base layer of polycrystalline silicon with an impurity diffused in said base layer.

27. The device according to claim 22, wherein said semiconductor layer comprises a first layer and a second layer formed over the first layer.

28. The device according to claim 27, wherein said first and second layers comprise polycrystalline layers, respectively.

* * * * *

UNITED STATES PATENT AND TRADEMARK OFFICE
CERTIFICATE OF CORRECTION

PATENT NO. : 5,227,810
DATED : July 13, 1993
INVENTOR(S) : OCHI, Tsuneo

It is certified that error appears in the above-indentified patent and that said Letters Patent is hereby corrected as shown below:

Column 12, between lines 19 and 20,

Insert, --a recorder circuit section including: a shift register for shifting signals supplied from--.

Signed and Sealed this

Seventh Day of June, 1994

Attest:

BRUCE LEHMAN

Attesting Officer      Commissioner of Patents and Trademarks